(12) United States Patent
Kobayashi et al.

(10) Patent No.: US 10,648,671 B2
(45) Date of Patent: May 12, 2020

(54) FUEL INJECTION DEVICE

(71) Applicants: KAWASAKI JUKOGYO KABUSHIKI KAISHA, Kobe-shi, Hyogo (JP); JAPAN AEROSPACE EXPLORATION AGENCY, Chofu-shi, Tokyo (JP)

(72) Inventors: Masayoshi Kobayashi, Kobe (JP); Ryusuke Matsuyama, Osaka (JP); Kenta Yamaguchi, Kakogawa (JP); Hitoshi Fujiwara, Chofu (JP)

(73) Assignees: KAWASAKI JUKOGYO KABUSHIKI KAISHA, Hyogo, Kobe-shi (JP); JAPAN AEROSPACE EXPLORATION AGENCY, Chofu-shi, Tokyo (JP)

( * ) Notice: Subject to any disclaimer, the term of this patent is extended or adjusted under 35 U.S.C. 154(b) by 543 days.

(21) Appl. No.: 15/435,680

(22) Filed: Feb. 17, 2017

(65) Prior Publication Data
US 2017/0159937 A1 Jun. 8, 2017

Related U.S. Application Data

(63) Continuation of application No. PCT/JP2015/073024, filed on Aug. 17, 2015.

(30) Foreign Application Priority Data

Aug. 18, 2014 (JP) .................................. 2014-166126

(51) Int. Cl.
*F23R 3/16* (2006.01)
*F23R 3/28* (2006.01)
(Continued)

(52) U.S. Cl.
CPC .................. *F23R 3/16* (2013.01); *F02C 7/22* (2013.01); *F02C 7/232* (2013.01); *F02C 7/24* (2013.01);
(Continued)

(58) Field of Classification Search
CPC ...... F23R 3/16; F23R 3/28; F02C 7/20; F02C 7/22; F02C 7/24; F02C 7/28
See application file for complete search history.

(56) References Cited

U.S. PATENT DOCUMENTS 5,228,283 A 7/1993 Sciocchetti
5,355,670 A 10/1994 Sciocchetti
(Continued)

FOREIGN PATENT DOCUMENTS

CN 1056150 A 11/1991
CN 103292355 A 9/2013
(Continued)

OTHER PUBLICATIONS

Communication dated Oct. 26, 2017, from the State Intellectual Property Office of People's Republic of China in counterpart Application No. 201580043938.4.
(Continued)

*Primary Examiner* — Arun Goyal
(74) *Attorney, Agent, or Firm* — Sughrue Mion, PLLC

(57) ABSTRACT

A fuel injection device for a gas turbine combustor includes: a pilot fuel injector; a main fuel injector; a plurality of main fuel injection holes arranged in the main fuel injector to inject the fuel rearward; a main fuel injection nozzle to guide the fuel to a main air passage, protruding rearward from a circumference of the main fuel injection hole into the opening formed in a passage wall that forms the main air passage; a heat-shielding casing covering the main fuel injector; and a ring member interposed in an axial gap
(Continued)

between the passage wall and the heat-shielding casing. The ring member covers a through-hole gap between the main fuel injection nozzle and a through-hole in the heat-shielding casing, and has a purge passage communicated with the opening to introduce air into the main air passage.

4 Claims, 3 Drawing Sheets

(51) Int. Cl.
   *F02C 7/232* (2006.01)
   *F02C 7/22* (2006.01)
   *F02C 7/24* (2006.01)

(52) U.S. Cl.
   CPC ............ *F23R 3/28* (2013.01); *F05D 2220/32* (2013.01); *F05D 2240/35* (2013.01); *F05D 2260/231* (2013.01)

(56) References Cited

U.S. PATENT DOCUMENTS

| | | | |
|---|---|---|---|
| 6,898,926 B2 | 5/2005 | Mancini | |
| 8,266,912 B2 * | 9/2012 | Berry | F02C 7/28 277/647 |
| 8,276,388 B2 * | 10/2012 | Cayre | F23R 3/14 60/740 |
| 8,935,911 B2 | 1/2015 | Nonaka et al. | |
| 9,109,553 B2 | 8/2015 | Matsuyama et al. | |
| 9,115,899 B2 | 8/2015 | Koizumi et al. | |
| 9,316,397 B2 * | 4/2016 | Stewart | F23R 3/283 |
| 9,429,324 B2 | 8/2016 | Matsuyama et al. | |
| 2004/0148937 A1 | 8/2004 | Mancini | |
| 2007/0028619 A1 | 2/2007 | Spooner | |
| 2010/0269506 A1 | 10/2010 | Nonaka et al. | |
| 2012/0174588 A1 | 7/2012 | Rackwitz et al. | |
| 2012/0304649 A1 | 12/2012 | Matsuyama et al. | |
| 2013/0219903 A1 | 8/2013 | Koizumi et al. | |
| 2013/0327849 A1 | 12/2013 | Matsuyama et al. | |
| 2015/0082797 A1 | 3/2015 | Matsuyama et al. | |

FOREIGN PATENT DOCUMENTS

| | | |
|---|---|---|
| JP | 2004-012039 A | 1/2004 |
| JP | 2004-233041 A | 8/2004 |
| JP | 2010-255944 A | 11/2010 |
| JP | 2012-251741 A | 12/2012 |
| JP | 2013-253738 A | 12/2013 |
| WO | 2013/115671 A1 | 8/2013 |
| WO | 2013183618 A1 | 12/2013 |

OTHER PUBLICATIONS

International Preliminary Report on Patentability and translation of Written Opinion issued from the International Bureau in counterpart International Application No. PCT/JP2015/073024, dated Mar. 2, 2017.

International Search Report for PCT/JP2015/073024, dated Nov. 2, 2015.

* cited by examiner

FUEL INJECTION DEVICE

CROSS REFERENCE TO THE RELATED APPLICATION

This application is a continuation application, under 35 U.S.C. § 111(a), of international application No. PCT/JP2015/073024, filed Aug. 17, 2015, which claims priority to Japanese patent application No. 2014-166126, filed Aug. 18, 2014, the disclosure of which are incorporated by reference in their entirety into this application.

BACKGROUND OF THE INVENTION

Field of the Invention

The present invention relates to a fuel injection device including fuel injectors for use in a combustor of a gas turbine engine.

Description of Related Art

In recent years, in consideration of the environment, there is a need for a reduction of emissions such as NOx (nitrogen oxide) emitted from gas turbine engines. As a fuel injection device for the conventional aircraft gas turbine combustor, a fuel injection device of a diffusive combustion type is generally known. In the diffusion combustion type, since the burning reaction takes place based on the stoichiometric mixture ratio, the flame temperature tends to increase. Considering that the emission of NOx is known to exponentially increase with the increase of the flame temperature, lowering of the flame temperature appears to effectively suppress the emission of NOx. However, in the current situation of the propensity for high temperature and high pressure in the gas turbine engine, further suppression of the emission of NOx with the conventional diffusive combustion method is limited.

In order to lower the flame temperature, a fuel injection device of a lean combustion method is considered effective. The lean combustion method is known to be a method of burning an air-fuel mixture in which the ratio of fuel relative to air is lowered. The lean combustion according to this method contributes to a considerable reduction of the flame temperature as compared with that afforded by the conventional diffusive combustion method. On the other hand, however, the lean combustion method tends to result in an instable and incomplete combustion because of the relatively low flame temperature. In view of this, a concentric-type fuel injection device in which a pilot fuel injector is disposed on an inner side and a main fuel injector is disposed on an outer side so as to be concentric with the pilot fuel injector is used (see, for example, Patent Document 1). This concentric-type fuel injection device realizes a low NOx emission by mainly causing the main fuel injector to perform lean combustion while causing the pilot fuel injector to maintain stable combustion by a diffusion combustion method during a high power operation, and by causing the pilot fuel injector to stabilize a flame by diffusion combustion during a low power operation.

RELATED DOCUMENT

Patent Document

[Patent Document 1] JP Laid-open Patent Publication No. 2012-251741

SUMMARY OF THE INVENTION

However, in the concentric-type fuel injection device, both of the main fuel injector and the pilot fuel injector are put into operation during the high power operation, but only the pilot fuel injector is put into operation and the main fuel injector is not put into operation during the low power operation. Accordingly, fuel in a fuel pipe of the main fuel injector does not flow during the low power operation in which the main fuel injector is not put into operation. For this reason, coking of fuel remaining in the fuel pipe of the main fuel injector sometimes occurs due to heat of high-temperature air flowing around the main fuel injector during the low power operation.

One measure to prevent coking of fuel remaining in the fuel pipe of the main fuel injector is to cover the main fuel injector with a heat-shielding casing. In this case, however, there is a possibility that coking of fuel dripped from an injection hole of the main fuel injector occurs in the heat-shielding casing when the main fuel injector is not in operation. As a result, there is a possibility of occurrence of stress resulting from a thermal expansion difference between the main fuel injector stuck by carbonized fuel, which has a relatively low temperature, and the heat-shielding casing, which is exposed to a high temperature.

An object of the present invention is to provide a fuel injection device in which coking in a main fuel injector can be effectively prevented in order to solve the above problems.

In order to attain the above object, a fuel injection device according to the present invention is a fuel injection device for use in a combustor of a gas turbine, including: a pilot fuel injector disposed on an axis of the fuel injection device; a main fuel injector having an annular shape and disposed so as to be concentric with the pilot fuel injector and encircle an outer periphery of the pilot fuel injector; a passage wall that forms a main air passage configured to introduce an air to be mixed with a fuel injected from the main fuel injector in a radial direction, the passage wall having an opening configured to introduce the fuel from the main fuel injector into the main air passage; a plurality of main fuel injection holes that are formed in the main fuel injector so as to be spaced circumferentially from each other and are configured to inject the fuel axially rearward; a main fuel injection nozzle protruding axially rearward from a circumference of the main fuel injection hole so as to face the opening, and configured to guide the fuel to the main air passage; a heat-shielding casing covering the main fuel injector and having a through-hole that allows the main fuel injection nozzle to penetrate therethrough, at least a portion of the heat-shielding casing being spaced axially from the passage wall; and a ring member interposed in an axial gap defined between the passage wall and the heat-shielding casing, the ring member covering a through-hole gap defined between the main fuel injection nozzle and an inner peripheral surface of the through-hole, and having a purge passage communicated with the opening and configured to introduce an air within the axial gap as an air for fuel purge into the main air passage.

According to this configuration, since a cylindrical nozzle protrudes from the main fuel injection hole, it is possible to prevent coking of a fuel from the fuel injection hole in the heat-shielding casing while the main fuel injector is not in operation. Furthermore, since the ring member covers an outer peripheral surface of the main fuel injection nozzle, the main fuel injection nozzle is insulated from heat of a high-temperature air. Furthermore, the high-temperature air is prevented from flowing into the heat-shielding casing and is introduced as an air for fuel purge into the main air passage. This prevents entry of fuel into the heat-shielding casing. As a result, it is possible to effectively prevent coking in the heat-shielding casing.

In one embodiment of the present invention, the ring member may be loosely fitted onto the main fuel injection nozzle. According to this configuration, it is possible to prevent coking with more certainty without influence of thermal expansion of the fuel injection nozzle.

In one embodiment of the present invention, the ring member may include a base covering the through-hole gap and a slot portion provided on a rear surface of the base and having a plurality of slots extending radially, each slot forming the purge passage. According to this configuration, it is possible to easily regulate the amount of the air introduced as an air for fuel purge into the air passage by adjusting the dimension of the slots and the number of slots.

In one embodiment of the present invention, a height dimension of the ring member may match a dimension of the axial gap. According to this configuration, it is possible to insulate the main fuel injection nozzle from heat with more certainty and to introduce high-temperature air into the main air passage.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
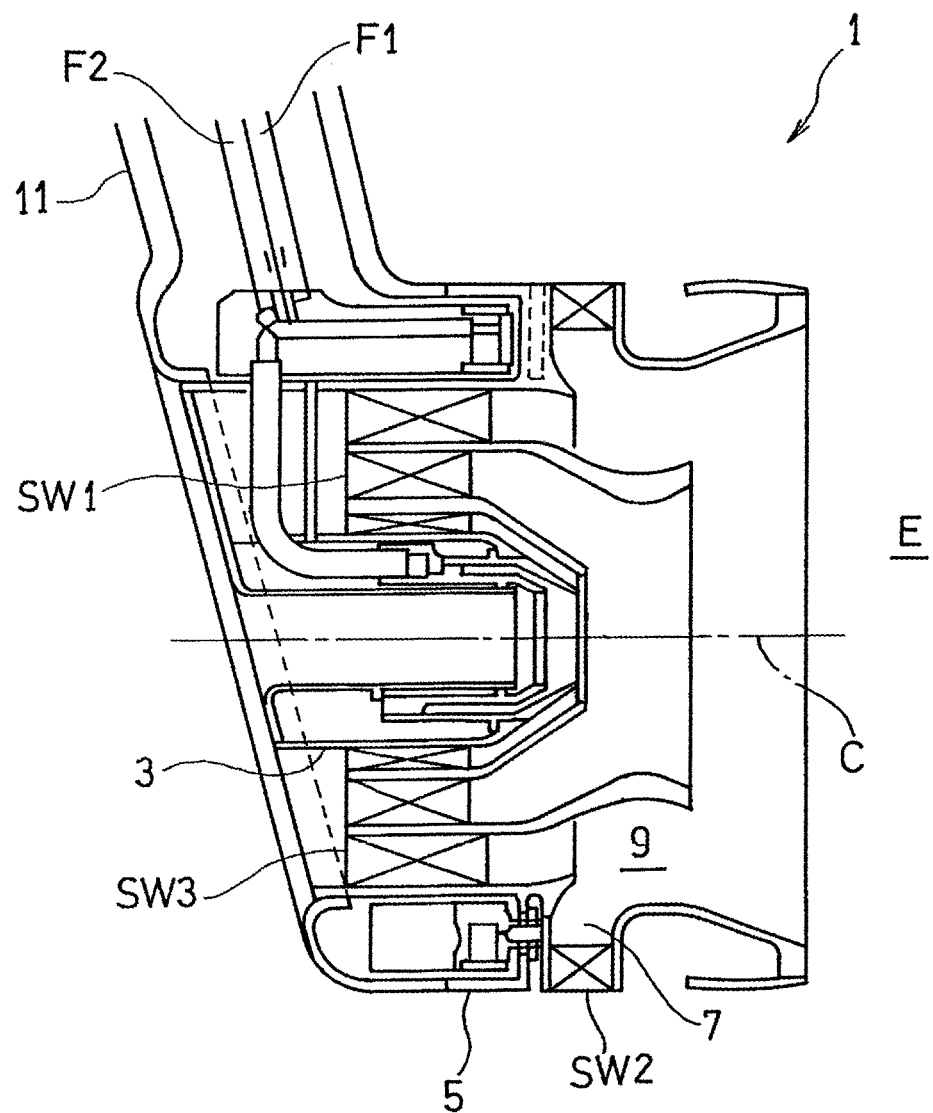
FIG. 1 is a cross-sectional view showing a fuel injection device according to one embodiment of the present invention.

An embodiment of the present invention will be described below with reference to the drawings. FIG. 1 shows a fuel injection device 1 according to an embodiment of the present invention. The fuel injection device 1 is used in a combustor of a gas turbine engine to mix a fuel with a compressed air supplied from a compressor of the gas turbine engine so that the mixture is combusted in a combustion chamber E of the combustor and to supply high-temperature and high-pressure combustion gas generated by the combustion to a turbine so that the turbine is driven. A plurality of fuel injection devices 1 according to the present embodiment are disposed at regular intervals so as to be concentric with an engine rotation axis (not shown). Hereinafter, the combustion chamber E side in a direction of an axis C of the fuel injection device 1 is referred to as a rear side, and a side opposite to the rear side is referred to as a front side. The expressions "rear" and "front" added to names of constituent elements in the embodiments are used in the same meaning. Hereinafter, a direction that is parallel to the axis C of the fuel injection device 1 is simply referred to as an "axial direction".

The fuel injection device 1 includes a pilot fuel injector 3 disposed on the axis C of the fuel injection device 1 and a main fuel injector 5 provided so as to encircle an outer periphery of the pilot fuel injector 3 and be concentric with the axis C of the pilot fuel injector 3. A fuel injected from the pilot fuel injector 3 is mixed with an air delivered mainly through a pilot swirler SW1 and is then supplied to the combustion chamber E of the combustor. Meanwhile, a fuel for lean combustion injected from the main fuel injector 5 is mixed with an air introduced radially from a main outer swirler SW2 to a first main air passage 7 and then further mixed with an air introduced axially from a main inner swirler SW3 to a second main air passage 9, and is then supplied as a lean mixture gas to the combustion chamber E.

In the fuel injection device 1 of the present embodiment, a swirler for introducing an air in the radial direction is disposed on a radially outer side of a swirlers for introducing an air in the axial direction so that air flows through the first main air passage 7 from the radially outer side to the radially inner side. Alternatively, the swirler for introducing air in the radial direction may be disposed on a radially inner side of the swirlers for introducing the air in the axial direction so that the air flows through the first main air passage 7 from the radially inner side to the radially outer side.

Each fuel injection device 1 is supported by a housing (not shown) of the combustor at a stem portion 11 that forms a fuel pipe unit. The fuel pipe unit includes a first fuel introducing system F1 for introducing a fuel to be supplied to the pilot fuel injector 3 and a second fuel introducing system F2 for introducing a fuel for lean combustion to be supplied to the main fuel injector 5.

Figure 2:
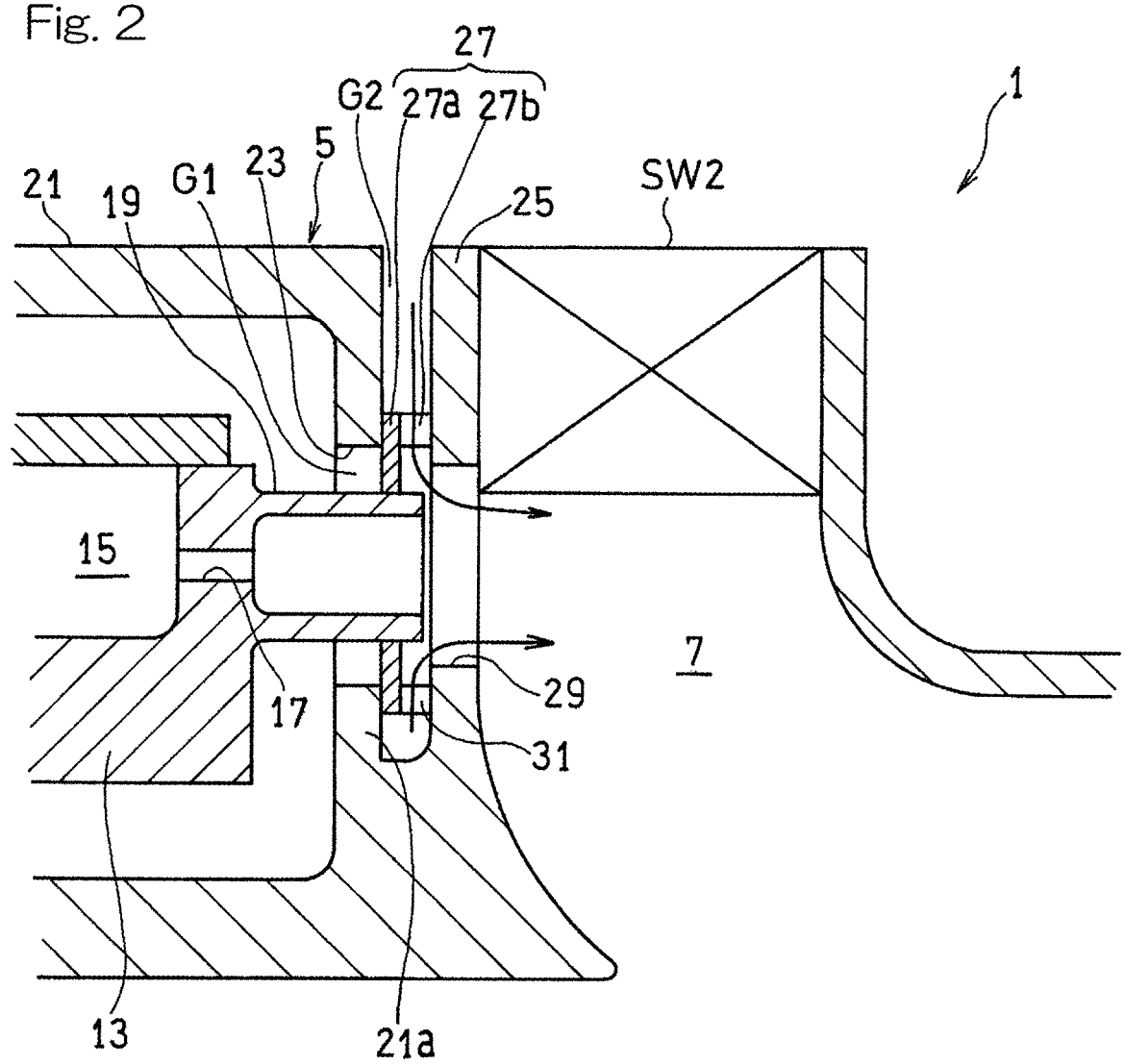
FIG. 2 is an enlarged cross-sectional view showing a portion of the fuel injection device shown in FIG. 1.

FIG. 2 shows details of a structure of the main fuel injector 5 of the fuel injection device 1. The main fuel injector 5 includes a main fuel flow passage forming member 13 that has an annular shape. The main fuel flow passage forming member 13 has an inner space which forms a fuel passage 15 for a main fuel. The main fuel flow passage forming member 13 has a rear end surface formed with a plurality of through-holes that are opened in the axial direction and are provided so as to be spaced from each other in a circumferential direction. The through-holes function as main fuel injection holes 17 to inject a fuel towards the rear side in the axial direction. A main fuel injection nozzle 19 that has a cylindrical shape is provided so as to protrude axially rearward from a circumference of each of the main fuel injection hole 17.

As shown in FIG. 2, the fuel injection device 1 further includes a heat-shielding casing 21 that covers the main fuel injector 5. The heat-shielding casing 21 supports the main fuel injector 5 with respect to the stem portion 11 (see FIG. 1). The heat-shielding casing 21 insulates heat transfer from an outside high-temperature air to the main fuel injector 5.

The heat-shielding casing 21 is formed as a hollow annular member. The heat-shielding casing 21 has an inner wall surface which is spaced from the main fuel injector 5. The heat-shielding casing 21 is formed with, in respective portions of a rear wall portion 21a of the heat-shielding casing 21 that correspond to the main fuel injection nozzles 19, a plurality of through-holes 23 which are opened in the axial direction and allow respective main fuel injection nozzles 19 to penetrate therethrough. The plurality of through-holes 23 are formed so as to be spaced from each other at regular intervals in a circumferential direction of the heat-shielding casing 21. Each through-hole 23 has a diameter larger than an outer diameter of the main fuel injection nozzle 19, so that an annular through-hole gap G1 is defined between the main fuel injection nozzle 19 and an inner peripheral surface of the through-hole 23. This annular through-hole gap G1 is set to a size that can absorb a thermal expansion difference between the main fuel flow passage forming member 13 cooled by a fuel flowing through the fuel passage 15 and the heat-shielding casing 21 heated by an high-temperature components disposed outside. A portion or entire of the heat-shielding casing 21 is spaced axially from a passage wall 25 positioned on front side thereof and forming the first main air passage 7. Accordingly, an axial gap G2 is defined between the heat-shielding casing 21 and the passage wall 25 that forms the first main air passage 7.

A ring member 27 is interposed in the axial gap G2 between the passage wall 25 that forms the first main air passage 7 and the rear wall portion 21a of the heat-shielding casing 21. The ring member 27 is an annular-shaped member loosely fitted onto the outer peripheral surface of the main fuel injection nozzle 19. The ring member 27 covers the through-hole gap G1 defined between the main fuel injection nozzle 19 and the inner peripheral surface of the through-hole 23 of the heat-shielding casing 21. The passage wall 25 that forms the first main air passage 7 has an opening 29 through which a fuel from the main fuel injector 5 is introduced into the first main air passage 7. The main fuel injection nozzle 19 protrudes so as to face the opening 29. The ring member 27 has a purge passage 31 communicated with the opening 29 of the passage wall 25 to introduce an air within the axial gap G2 into the first main air passage 7.

Figure 3:
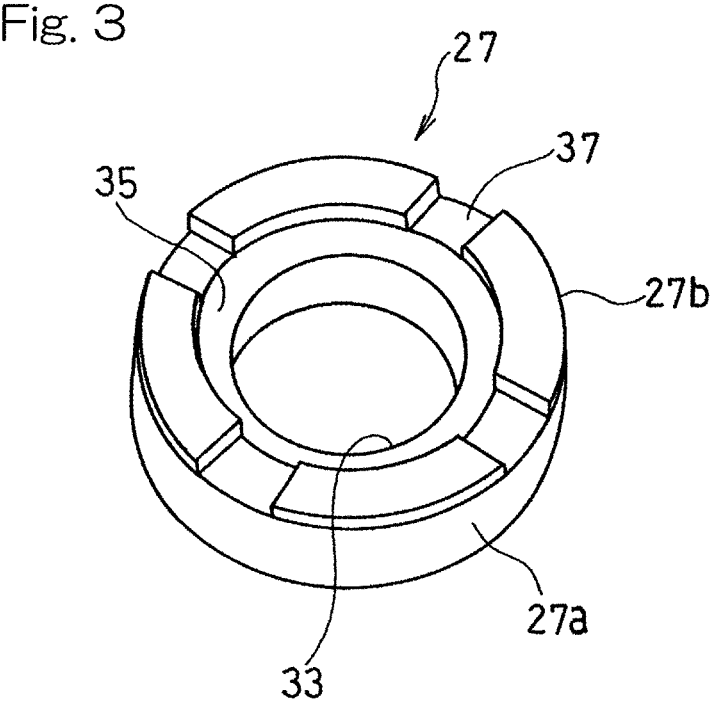
FIG. 3 is a perspective view showing a ring member 27 used in the fuel injection device shown in FIG. 1.

FIG. 3 shows one example of a structure of the ring member 27. The ring member 27 includes a base 27a that covers the through-hole gap G1, and a slot portion 27b that is provided on a rear surface of the base 27a and has a plurality of slots 37 extending radially. More specifically, the base 27a of the ring member 27 has a disc shape having, at a radially center position thereof, a central hole 33, which is a through-hole opened in the axial direction. The slot portion 27b of the ring member 27 according to the present embodiment has an annular groove 35 on an inner peripheral edge of the ring member 27 (i.e., an outer peripheral edge of the central hole 33), and a plurality of (four in the example shown in FIG. 3) grooves, i.e., the slots 37 extending radially from the annular groove 35 to the outer peripheral edge of the ring member 27 in the radial direction. The plurality of slots 37 are arranged at regular intervals in the circumferential direction of the ring member 27. The hole diameter of the central hole 33 of the ring member 27 is set to be slightly larger than the outer diameter of the main fuel injection nozzle 19 so that the ring member 27 is slidable relative to the main fuel injection nozzle 19.

By loosely fitting the ring member 27 having such a structure onto the main fuel injection nozzle 19 so that the base 27a faces towards the front side and the slot portion 27b faces towards the rear side as shown in FIG. 2, the through-hole gap G1 defined between the main fuel injection nozzle 19 and the inner peripheral surface of the through-hole 23 of the heat-shielding casing 21 is covered by the ring member 27 from the rear side (i.e., the axial gap G2 side). In other words, an opening on the rear-side of the annular through-hole gap G1 is closed by the ring member 27. Furthermore, the outer peripheral surface of the main fuel injection nozzle 19 is covered by the ring member 27. Even when a thermal expansion difference in the radial direction occurs between the heat-shielding casing 21, which is exposed to a high-temperature air, and the fuel flow passage forming member 13, which is cooled by fuel, the ring member 27 follows by sliding in the gap G2 together with the main fuel injection nozzle 19, and therefore the rear-side opening of the through-hole gap G1 is constantly covered by the ring member 27. Furthermore, only an air that has passed through the slots 37 of the ring member 27 can flow from the axial gap G2 into the first main air passage 7 through the opening 29.

The height dimension of the ring member 27 (an axial dimension of a portion of the ring member 27 in which the slots 37 are not provided) may match the dimension of the axial gap G2. This makes it possible to shield the main fuel injection nozzle 19 from heat with certainty while introducing a high-temperature air into the main air passage 7.

The annular groove 35 and the slots 37 of the slot portion 27b of the ring member 27 cooperatively form the purge passage 31. Since the ring member 27 has the slots 37 that serve as the purge passage 31, the amount of the air introduced into the air passage 7 as an air for fuel purge can be easily regulated to a proper amount according to need by adjusting the dimension of each slot 37 and number of slots 37. That is, the number of slots 37 of the ring member 27 is not limited to the example shown in FIG. 3 and can be set as appropriate (e.g., 5, 6, 8, or 12). The dimension of each slot 37 can be, for example, 0.5 mm in width, 1 mm in length, and 0.5 mm in depth but is not limited thereto and may be set as appropriate. The cross-sectional shape of each of the slots 37 is not limited to a rectangular recessed shape shown in FIG. 3 and may be, for example, a V-shape or a semi-circular shape. A direction in which the slots 37 extend is not limited to the radial direction of the ring member 27 and may be inclined with respect to the radial direction.

Although the slot portion 27b of the ring member 27 may be formed such that the annular groove 35 is omitted and the slots 37 extend from the outer peripheral edge to the inner peripheral edge of the ring member 27, the presence of the annular groove 35 allows the air for fuel purge to be introduced into the air passage 7 as an air flow that is uniform in the circumferential direction of the main fuel injection nozzle. Although the ring member 27 may be fixedly fitted onto the outer peripheral surface of the main fuel injection nozzle 19, loosely fitting the ring member 27 onto the main fuel injection nozzle 19 as in the present embodiment makes it possible to prevent with certainty the air from flowing into the heat-shielding casing 21 without influence of deformation resulting from thermal expansion of the main fuel injection nozzle 19. In the present embodiment, an example in which the main fuel injection nozzle 19 has a cylindrical shape and the through-hole gap G1 defined between the main fuel injection nozzle 19 and the inner peripheral surface of the through-hole 23 of the heat-shielding casing 21 has an annular shape has been described. However, the through-hole gap G1 can have any shape and size that are covered by the ring member 27, and the shapes of the main fuel injection nozzle 19 and the through-hole gap G1 are not limited to the examples of the present embodiment.

As described above, according to the fuel injection device 1 according to the present embodiment, the main fuel injection nozzle 19 having a cylindrical shape protrudes from the main fuel injection hole 17. This makes it possible to prevent coking of a fuel from the main fuel injection holes 17 in the heat-shielding casing 21 while the main fuel injector 5 is not in operation. Furthermore, the ring member 27 prevents flow of high-temperature air into the heat-shielding casing 21 and allows the high-temperature air to be introduced as air for fuel purge into the first main air passage 7. It is therefore possible to effectively prevent coking in the main fuel injection nozzle 19.

Although the present invention has been fully described in connection with the embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Fuel injection device
3 . . . Pilot fuel injector
5 . . . Main fuel injector
7 . . . First main air passage (Main air passage)
17 . . . Main fuel injection hole
19 . . . Main fuel injection nozzle
21 . . . Heat-shielding casing
25 . . . Passage wall
27 . . . Ring member
31 . . . Purge passage
37 . . . Slot
G1 . . . Through-hole gap
G2 . . . Axial gap

What is claimed is:

1. A fuel injection device for a combustor of a gas turbine, the fuel injection device comprising:

a pilot fuel injector disposed on an axis of the fuel injection device;

a main fuel injector having an annular shape and disposed so as to be concentric with the pilot fuel injector and encircle an outer periphery of the pilot fuel injector;

a passage wall that forms a main air passage into which a first flow of air to be mixed with a fuel injected from the main fuel injector is introduced in a radial direction, the passage wall having an opening configured to introduce the fuel from the main fuel injector into the main air passage;

a plurality of main fuel injection holes that are formed in the main fuel injector so as to be spaced circumferentially from each other and are configured to inject the fuel in an axially downstream direction toward a combustion chamber of the combustor;

a main fuel injection nozzle protruding in the axially downstream direction from a circumference of each of the plurality of main fuel injection holes so as to face the opening, and configured to guide the fuel to the main air passage;

a heat-shielding casing covering the main fuel injector and having a plurality of through-holes that allows the main fuel injection nozzle to penetrate therethrough, at least a portion of the heat-shielding casing being spaced axially from the passage wall; and a ring member interposed in an axial gap defined between the passage wall and the heat-shielding casing, the ring member covering a through-hole gap defined between an outer surface of the main fuel injection nozzle and an associated one of the plurality of through-holes, and having a purge passage communicated with the opening and configured to introduce a second flow of the air within the axial gap as the air for fuel purge into the main air passage.

2. The fuel injection device as claimed in claim 1, wherein the ring member is loosely fitted onto the main fuel injection nozzle.

3. The fuel injection device as claimed in claim 1, wherein the ring member includes a base covering the through-hole gap and a slot portion provided on a rear surface of the base and having a plurality of slots extending radially, each of the plurality of slots forming the purge passage.

4. The fuel injection device as claimed in claim 1, wherein a height dimension of the ring member matches a dimension of the axial gap.

\* \* \* \* \*